United States Patent
Sirigu et al.

(10) Patent No.: US 12,190,746 B2
(45) Date of Patent: Jan. 7, 2025

(54) METHOD AND DEVICE FOR ASSISTING READING AND LEARNING BY FOCUSING ATTENTION

(71) Applicants: Universite Claude Bernard Lyon 1, Villeurbanne (FR); CENTRE NATIONAL DE LA RECHERCHE SCIENTIFIQUE, Paris (FR)

(72) Inventors: Angela Sirigu, Lyons (FR); Alice Gomez, Chassieu (FR); Thomas Perret, Villeurbanne (FR); Guillaume Lio, Grenoble (FR); Jean-René Duhamel, Lyons (FR)

(73) Assignees: Universite Claude Bernard Lyon 1, Villeurbanne (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 404 days.

(21) Appl. No.: 17/588,642

(22) Filed: Jan. 31, 2022

(65) Prior Publication Data

US 2022/0262340 A1    Aug. 18, 2022

(30) Foreign Application Priority Data

Feb. 2, 2021 (FR) ........................... 2100991
Feb. 2, 2021 (FR) ........................... 2100992

(51) Int. Cl.
  *G09B 17/00*   (2006.01)
  *G10L 15/02*   (2006.01)

(52) U.S. Cl.
  CPC ............ *G09B 17/006* (2013.01); *G10L 15/02* (2013.01); *G10L 2015/025* (2013.01)

(58) Field of Classification Search
  CPC ..................... G10L 15/02; G10L 2015/025
  See application file for complete search history.

(56) References Cited

U.S. PATENT DOCUMENTS 6,185,533 B1 * 2/2001 Holm ................. G10L 13/10
                                               704/211
8,930,192 B1 * 1/2015 Meisel ................. G06F 3/167
                                               704/260

(Continued)

FOREIGN PATENT DOCUMENTS

EP    2778885 A1    9/2014
FR    3067140 A1    12/2018

(Continued)

OTHER PUBLICATIONS

Notaro, Gina Marie "Development and Integration of Low-Cost Bio-Measurement Systems for Neuroscientific Research." PhD diss., Dartmouth College, 2017. (Year: 2017).*

(Continued)

*Primary Examiner* — Daniel C Washburn
*Assistant Examiner* — Paul J. Mueller
(74) *Attorney, Agent, or Firm* — Occhiuti & Rohlicek LLP

(57) ABSTRACT

A method for assisting a user in reading and in learning to read includes displaying a succession of graphemic entities on a screen. These are displayed with first values for several display parameters so as to enable a user to detect and identify them. The method continues with detecting when the user points to a particular graphemic entity with the first values of the display parameters. The screen then simultaneously displays those graphemic entities that are adjacent to the particular graphemic entity with the first values of the display parameters and the particular graphemic entity with second values for the display parameters. At least one of these second values differs from one of the first values for a given display parameter. This enables the user to identify the particular graphemic entity and causes acoustic rendering of (Continued)

a phonemic entity associated with the particular graphemic entity that the user pointed to.

20 Claims, 4 Drawing Sheets

(56) References Cited

U.S. PATENT DOCUMENTS

| | | | |
|---|---|---|---|
| 9,478,143 B1* | 10/2016 | Bowen | G09B 5/062 |
| 2002/0025853 A1* | 2/2002 | Kojima | A63F 13/30 |
| | | | 463/40 |
| 2018/0197433 A1* | 7/2018 | Tavares | G09B 21/007 |
| 2023/0386358 A1* | 11/2023 | McKenzie | G09B 17/02 |

FOREIGN PATENT DOCUMENTS

| | | |
|---|---|---|
| WO | 98/06082 A1 | 2/1998 |
| WO | 03/104936 A2 | 12/2003 |
| WO | 2006105897 A1 | 10/2006 |

OTHER PUBLICATIONS

Broadbent, Patricia Stéphanie "Digital display: Canadian art on the World Wide Web and on CD-ROM." PhD diss., Carleton University, 2003. (Year: 2003).*

Marie-France Ehrlich, Hubert Tardieu, "Lire, comprendre, mémoriser les textes sur écran video" Communication et langages, No. 65, 1985 pp. 91-106.

* cited by examiner

[Fig. 1]
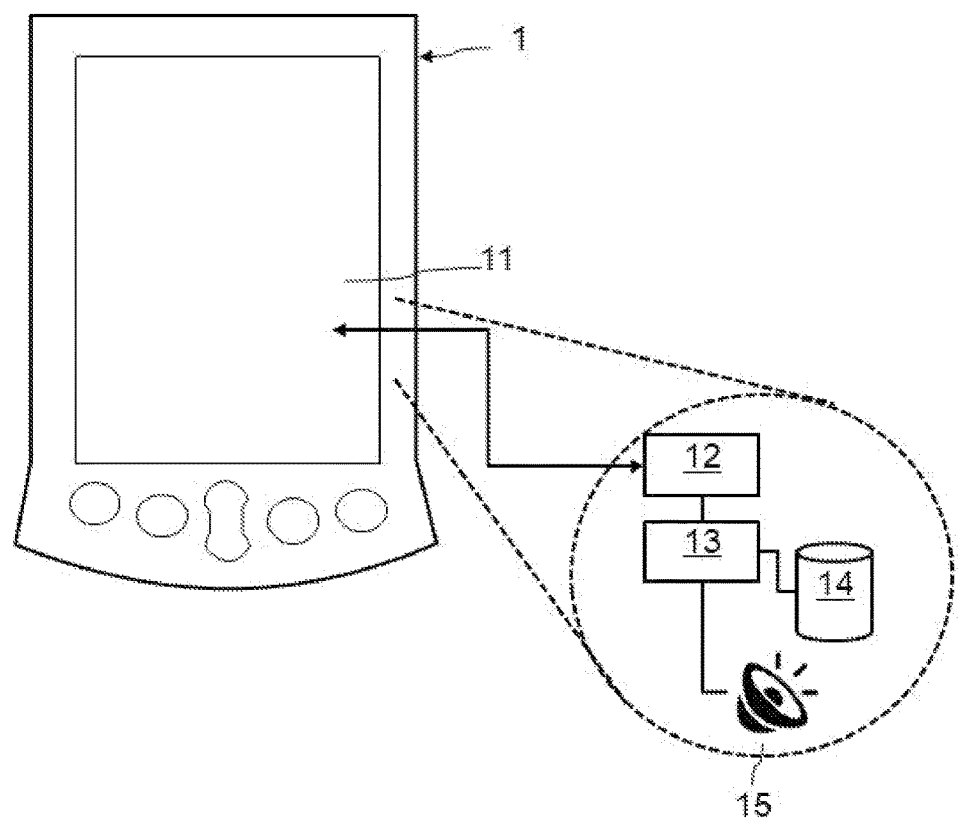
[Fig. 2]
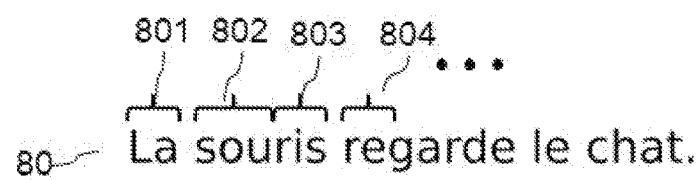
[Fig. 3]
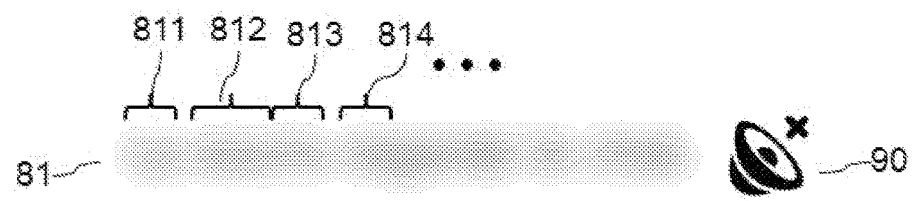

[Fig. 4]
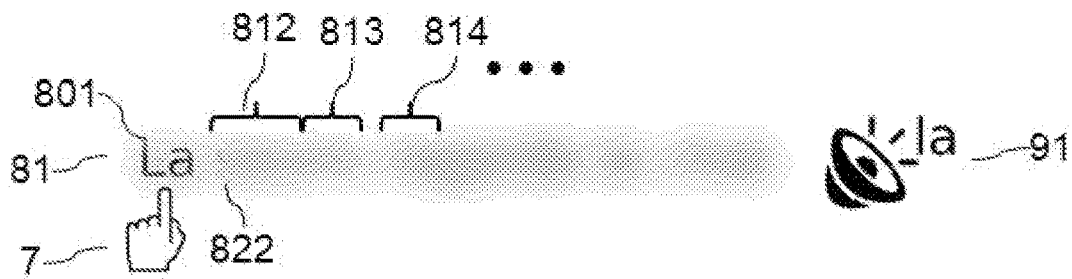
[Fig. 5]
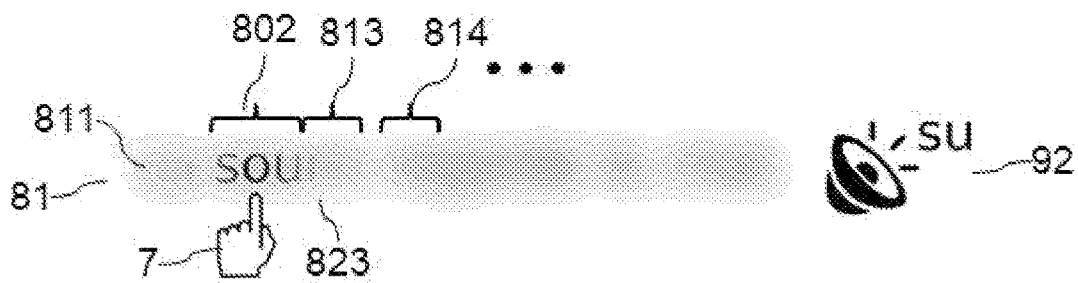
[Fig. 6]
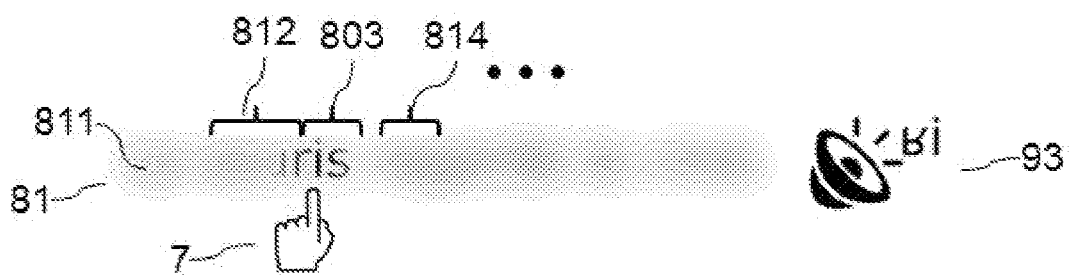
[Fig. 7]
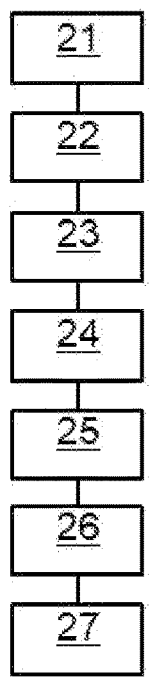

[Fig. 8]
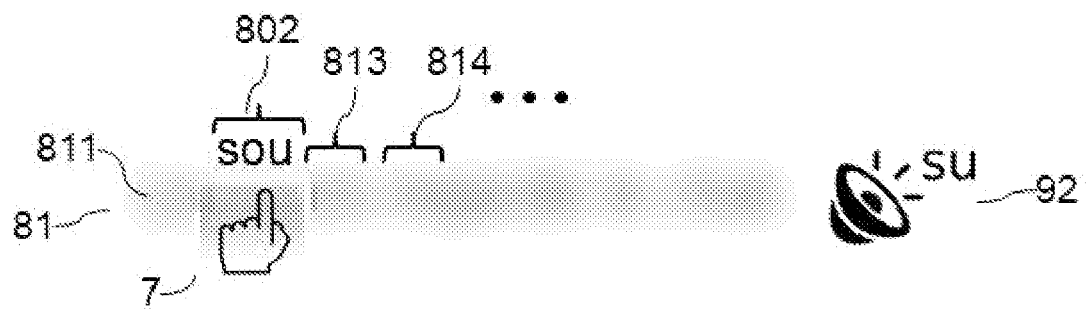
[Fig. 9]
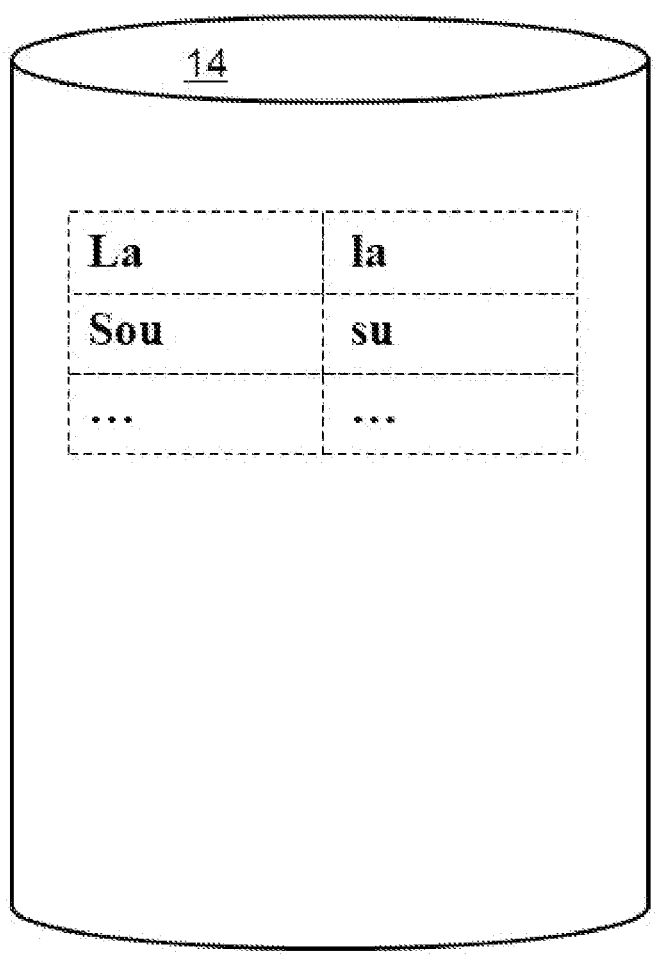

[Fig. 10]
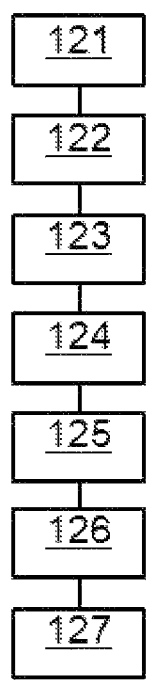

METHOD AND DEVICE FOR ASSISTING READING AND LEARNING BY FOCUSING ATTENTION

CROSS REFERENCE TO RELATED APPLICATIONS

This application is a claims priority to French Application No. 2100991, filed on Feb. 2, 2021, and French Application No. 2100992, filed on Feb. 2, 2021, the contents of which are hereby incorporated by reference in their entirety.

The invention concerns methods and devices in the field of reading to assist and facilitate its learning.

Learning to read is a complex learning phase, requiring an understanding of the relationship between phonemes and graphemes. This learning process is even more difficult in languages where this correspondence is not unique, since character sequences and combinations correspond to specific phonemic entities and are dependent on context or associations between graphemic entities. This learning is even more difficult for people with "dys" or attention problems as frequently observed in clinics.

To date, there is no satisfactory solution for assisting and promoting independent reading, for detecting and characterising "dys" problems, or for studying reading strategies.

The invention aims to overcome one or more of these drawbacks. The invention thus relates to a method to assist with reading and learning to read, as defined in the appended claims.

The invention also relates to the various variants of the appended claims.

Further features and advantages of the invention will be clear from the following description, which is indicative and not limiting, with reference to the attached drawings, in which:

FIG. 1 is a schematic representation of a device to assist with learning to read according to an example of an embodiment of the invention;

FIG. 2 is an example of a succession of graphemic entities used to implement a process to assist with learning to read;

FIG. 3 illustrates the succession of graphemic entities of FIG. 1 with alteration;

FIG. 4, FIG. 5 and FIG. 6 illustrate the status of the display and the acoustic rendering for different pointings made by a user;

FIG. 7 is a schematic diagram of an example of an assistance process implemented according to an example of the invention;

FIG. 8 illustrates the state of the display and the acoustic rendering for an alternative implementation of the invention;

FIG. 9 is a schematic representation of an example of the contents of a database;

FIG. 10 is a schematic diagram of an example of an assistance process implemented according to another example or embodiment of the invention.

The invention is intended to assist a user with learning to read by means of a digital system. To this end, according to a first embodiment of the invention, a succession of adjacent graphemic entities that have undergone visual alteration are displayed on a screen. A user's pointing at one of the graphemic entities with alteration, and displayed, is detected. Simultaneously, the following is displayed:
the pointed graphemic entity, without alteration;
the adjacent graphemic entities of the pointed graphemic entity, with alteration.

During the display of the pointed graphemic entity without alteration, a phonemic entity associated with this pointed graphemic entity is acoustically rendered.

Thus, the user can focus his/her vision on the graphemic entity without alteration, the adjacent graphemic entities with alteration to reduce the phenomenon of interference of elements present in peripheral vision. Because of the acoustic rendering of the phonemic entity associated with this pointed graphemic entity and presented without alteration, the user can very precisely associate mentally this pointed graphemic entity and the acoustically rendered phonemic entity.

A wide variety of image alteration processes can be used. In particular, alteration by applying a Gaussian blur, by applying an average filter, by applying subsampling, or by JPEG encoding with a very high compression ratio, or any other low-pass linear digital filter, can be considered. Alterations can also be additive, for example by adding high-frequency, salt-and-pepper noise through spectrum contamination.

FIG. 1 shows a schematic representation of a device 1 to assist with learning to read according to an example of an embodiment of the invention. In particular, the device 1 is equipped with a display screen and a pointing device. The device 1 is also equipped with at least one loudspeaker.

The device 1 shown here is in the form of a digital tablet. The digital tablet has a touch screen 11, which can both display images and detect a user's touch pointing location. The digital tablet is also equipped with a loudspeaker 15. The digital tablet has access to a database 14. The database 14 is for example stored in a mass memory of the tablet. The digital tablet includes a processing system in the form of a central processing unit or digital-processing device 13, configured to drive various peripherals. The digital tablet here comprises a graphics card 12 for controlling the screen 11.

The database 14 stores a set of graphemic entities, to be displayed according to a succession of adjacent graphemic entities. For each of these graphemic entities, the database contains an associated phonemic entity to be rendered acoustically, as shown in the example in FIG. 9.

The device 1 is a digital system designed in particular to implement a method to assist with learning to read. Such a support method includes the following steps, illustrated in the diagram in FIG. 7:

In step 21, a succession 81 of adjacent graphemic entities is displayed on the screen 11, as shown in FIG. 3. The succession 81 of graphemic entities includes in particular the graphemic entities 811, 812, 813 and 814. The graphemic entities of the succession 81 are here altered in such a way as to enable their detection by a user when displayed, but in such a way as to prevent their identification. The lack of identification can be verified on a statistical basis, by checking that 95% of people in a test group are unable to identify these graphemic entities. It is possible to envisage a lack of identification in foveal or parafoveal vision by the user. The graphemic entities displayed with alteration thus enable their detection by the user, so that s/he be able to point to them. In other words, the altered graphemic entities have an alteration that makes them locatable, but not identifiable (e.g. in parafoveal vision from a configurable value below 10°). This procedure is used to encourage exploration of the text displayed.

These graphemic entities correspond, for example, to a sentence 80 as shown in FIG. 2. The sentence 80 includes, in particular, graphemic entities 801, 802, 803 and 804 corresponding to syllables. These graphemic entities include several graphemes for the most part. The length of the graphemic entities is illustrated here by a brace. In the example of the French language, the sentence 80 is displayed as a succession of graphemic entities aligned in a horizontal direction, to be read from left to right. The sentence 80 in FIG. 2 will be used here as an example of assistance with learning to read. Step 21 corresponds, for example, to a start-up step of the learning process, where the set of displayed graphemic entities is altered. The graphemic entity with alteration is here a special case generated by blurring, as shown in FIG. 3. Advantageously, no acoustic rendering is performed during the display of the succession 81, as indicated by the state 90 of the loudspeaker in FIG. 3.

In step 22, the user's pointing of the graphemic entity with alteration, and displayed 811, is detected. This pointing is illustrated by pointer 7 in FIG. 4.

In step 23, as shown in FIG. 4, the following is displayed simultaneously:

the pointed graphemic entity without alteration 801, corresponding to the syllable 'La' in French;

the adjacent graphemic entity with alteration 812. The graphemic entity 812 is considered altered if it cannot be identified in parafoveal vision by the user. Thus, a graphemic entity will be considered altered even if it is partially displayed not alerted but is not identifiable by a user when presented in parafoveal vision. In this example, all other graphemic entities in succession 81 other than graphemic entity 801 are displayed with alteration.

During the display of the pointed graphemic entity 801 without alteration, a phonemic entity associated with the graphemic entity 801 is acoustically rendered to the user. As shown in FIG. 4, the loudspeaker performs acoustic rendering of the syllable 'La', as indicated by its state 91.

In step 24, the user's pointing of the graphemic entity with alteration, and displayed 812, is detected. This pointing is illustrated by pointer 7 in FIG. 5.

In step 25, as shown in FIG. 5, the following is displayed simultaneously:

the pointed graphemic entity with alteration 802, corresponding to the syllable 'sou' in French;

the preceding graphemic entity with alteration 811 and the following graphemic entity with alteration 813. Because of the display with alteration of these adjacent graphemic entities, the user's attention can remain focused on the pointed graphemic entity 802, displayed without alteration. In this example, all other graphemic entities in succession 81 other than graphemic entity 802 are displayed with alteration.

During the display of the pointed graphemic entity 802 without alteration, a phonemic entity associated with the graphemic entity 802 is acoustically rendered to the user. As shown in FIG. 5, the loudspeaker performs acoustic rendering of the syllable 'su', as indicated by its state 92.

The assistance process continues recurrently for each new pointed graphemic entity. In step 26, the user's pointing of the graphemic entity with alteration, and displayed 813, is detected. This pointing is illustrated by pointer 7 in FIG. 6.

In step 27, as shown in FIG. 6, the following is displayed simultaneously:

the pointed graphemic entity with alteration 803, corresponding to the syllable 'ris' in French;

the preceding graphemic entity with alteration 812 and the following graphemic entity with alteration 814. Because of the display with alteration of these adjacent graphemic entities, the user's attention can remain focused on the pointed graphemic entity 803, displayed without alteration. In this example, all other graphemic entities in succession 81 other than graphemic entity 803 are displayed with alteration. As shown in FIG. 6, the loudspeaker performs the acoustic rendering of the phonetic syllable

TABLES 1

| 'ʁi' |
| --- | as indicated by its state 93.

The identification of the pointed graphemic entity can be based on a recurrent determination of the user's pointed position. For each detected pointed position, the nearest displayed graphemic entity can be determined. This graphemic entity remains the displayed graphemic entity without alteration, as long as the detected pointing remains closest to it.

Advantageously, when displaying the pointed graphemic entity without alteration, the beginning of the next adjacent graphemic entity is displayed without alteration, according to the reading order. Thus, as illustrated in FIG. 4, the beginning 822 of the graphemic entity 812 is displayed without alteration when displaying the graphemic entity 801 without alteration. Thus, as illustrated in FIG. 5, the beginning 823 of the graphemic entity 813 is displayed without alteration when displaying the graphemic entity 802 without alteration. Such a display prompts the user to continue pointing to the next phonemic entity in the succession, in order to encourage him/her to continue pointing in the reading direction. Such an operation favours the user's autonomy when learning to read, without external intervention.

Advantageously, the method detects the time between the pointing of successive graphemic entities by the user. If the user's pointing movements are measured in pixels, a speed can first be calculated in pixels per second, and then converted into graphemic entities per second based on the size of the display of the graphemic entities. Such a time measurement allows, for example, to extrapolate the reading speed of the user. The reading speed can be used, for example, to determine the user's reading level and to adapt the difficulty of texts that will be displayed later. The reading speed can also indicate a user difficulty if the reading speed remains particularly slow. Difficulty detection can also combine the reading speed measurement with an identification of another reading problem. The method may, for example, determine that the user is not pointing at the graphemic entities in the correct reading direction or is pointing at the graphemic entities erratically (e.g. by skipping graphemic entities or changing display lines before reaching the end). The method can also block the sound rendering when pointing to a graphemic entity if the text is not scanned in the correct reading direction, so that the user is informed that the reading direction is not correct. An additional acoustic or visual signal can also be rendered to the user to indicate this wrong reading direction.

The method to assist according to the invention can allow repeated sound rendering of a phonemic entity, either if the user keeps pointing at an associated graphemic entity for a long time or if s/he repeats pointing at this graphemic entity. The user can thus perfect the learning of this graphemic entity if s/he wishes.

The segmentation of the text into graphemic entities, with boundaries between the graphemic entities in sentence 80, can be implemented in advance so that the device 1 merely accesses predefined graphemic entities in a database. Such an operation allows a fast execution of the process on the device 1. In a further operation, the device 1 can implement a pre-processing of the sentence 80 to define the boundaries between the graphemic entities. Such a mode of operation allows the device 1 to have no limits in terms of texts that can be used for learning to read. Indeed, the device 1 can then implement the process on any text supplied to it and which is subject to pre-processing. This pre-processing can be implemented in a manner known per se to split a sentence 80 between different graphemic entities and associate a corresponding phonemic entity with each of these graphemic entities. For this purpose, graphemic entities can first be associated with corresponding phoneme entities, then the graphemic entities can be classified according to their sound characteristics (vowel, occlusive, fricative, nasal . . . ), then the phonemic entities and graphemic entities can be segmented at the desired scale, the desired scale being typically the syllable. Such a segmentation into syllables can in particular implement the algorithm described in the article 'automatic detection of syllable boundaries in spontaneous speech', published in 2010 and available at https://hal.archives-ouvertes.fr/hal-01393609. The association between graphemic entities and phonemic entities can be achieved for example by implementing the open source application distributed under the name eSpeak NG.

The display of the graphemic entities can be based on a pre-storage of images with alteration and without alteration of the individual graphemic entities for display on the screen during the implementation of the process. The display of graphemic entities can also be based on storing graphemic entities in vector form, with the sending of alteration parameters or of display parameters without alteration of these graphemic entities to a graphics card driving the display screen based on display parameters. Alternatively, it can be possible to generate the images with alteration and without alteration with the processing system of the device 1, to send these images to the graphics card of the device 1. One can envisage generating a global image of the graphemic entities to be displayed corresponding to FIG. 2, applying a global alteration of this global image to arrive at the image with alteration (here by blurring) illustrated in FIG. 3, then implementing a localised display without alteration of this image to obtain an image with a graphemic entity without alteration as illustrated in FIGS. 4 to 6.

A pre-processing of the display can be implemented as follows. The text of the succession of graphemic entities can be preprocessed to display the graphemic entities with alteration to be displayed, to determine the boundaries of the different graphemic entities of the succession, and to set display parameters without alteration.

The alteration or display without alteration of graphemic entities can be achieved by setting a standard deviation of a Gaussian blur filter between 0 and 3 times the font size. For an image without any alteration, the radius will be chosen to be zero. To enable the detection of the display of the graphemic entities and to prevent their identification, the radius or deviation of the Gaussian blur filtering will advantageously be at least 0.1 times the size of the font used, and preferably less than 0.5 times the size of the font used. The same Gaussian blurring radius can be applied for each pixel of an image corresponding to the graphemic entity to be displayed. Such alteration parameters can for example be provided to a graphics card as parameters for the display of graphemic entities. For a graphics card implementing the OpenGL programming interface, it can be given shader parameters such as alpha transparency values, Gaussian blurring standard deviation values, and Gaussian filtering application position values. The shader on the graphics card then performs the blurring/unblurring calculations for each of the pixels to be displayed, thus offloading the processing system of device 1.

The alteration and the display without alteration of graphemic entities can be achieved by defining the size of the display zones to which the alteration and display parameters should be applied. The length of the display zone to which the alteration parameters are applied corresponds to the length of the corresponding graphemic entity. A display parameter value without alteration can be associated with each of the points in the test zone. The values of this parameter can initially be set at several points:

- at the beginning and end of the display zone of the graphemic entity, the value of the parameter corresponds to the width of a space character;
- at the centre of the graphemic entity, the value of the parameter is defined from the total length of the graphemic entity;
- the values of the parameter outside the graphemic entities can be fixed to a value which keeps the display with alteration.

The other parameter values can be obtained by interpolation between the value at the centre of a graphemic entity and the value at one end of the graphemic entity.

In one variation, the value of this parameter is not fixed symmetrically with respect to the centre of the graphemic entity. Thus, an asymmetry can be provided so that the value of this parameter is shifted towards the beginning or towards the end of the graphemic entity. For a left to right reading direction, the position for which the value of this parameter is used can be shifted slightly to the right.

As detailed earlier, the display without alteration is not necessarily applied under the location pointed by the user but on the graphemic entity closest to or above the pointed location. Indeed, for example for a touch screen, the user will be encouraged to point under the graphemic entities to be read, and not on the graphemic entities to be read so that the vision of a displayed graphemic entity is not hindered by the user's finger. If the graphemic entities are displayed as a global image, the display parameters without alteration can be applied at a position vertically offset above the point.

The database 14 can either be stored in a mass memory of the assistance device 1 accessible to the user, or in a volatile memory of the assistance device 1 accessible to the user, or it can be stored in a remote computer server, accessible by the device 1.

The database 14 can either contain a vector version of the phonemic entities to be rendered (e.g. in phonetic form) or a sound file to be rendered.

The sound rendering of the phonemic entities associated with the graphemic entities advantageously takes into account the prosody of the text. The sound rendering can thus take into account the beginning and end of a sentence, the spaces between graphemic entities or the punctuation between these graphemic entities, these prosody parameters being identified during a pre-processing of the text. The speed of the sound output can also be adapted to the detected reading speed. The prosody parameters can for example be generated by means of an application such as the one distributed under the name eSpeak NG, the method can provide the following parameters for adapting the sound rendering of each phonemic entity: speed, amplitude and pitch. The speed of the sound can for example be adapted in a range between 80 and 140 words per minute, and corrected according to the detected reading speed (e.g. a maximum correction of ±20 words per minute). In practice, the maximum value can be limited so that there is not too much variation. For example: the user scrolls through the text at a first speed (e.g. tactile) corresponding to 100 m/m and then accelerates to a second speed (still tactile) of 130 m/m; the sound rendering reading of the syllable scrolled through at the second speed will then be 120 m/m and not 130 m/m. This encourages the user not to accelerate or decelerate too much.

The prosody parameters and phonemic entities in vector form can be provided to a text-to-speech application in order to generate the graphemic entities to be rendered. An application such as the one distributed under the reference Mbrola can be used.

In the above examples, the graphemic entities displayed and associated with the acoustically rendered phonemic entities are syllables. The process thus promotes learning assistance for users for whom the syllabic method is suitable. It is also possible to envisage other types of graphemic entities implemented according to the invention and associated with the phonemic entities to be rendered, for example alphabetical letters, words or ideograms.

The device 1 can use different interfaces to identify a user's pointing. The device 1 can thus comprise a touch screen to identify a point of contact between the user and the touch screen, the device 1 can also be connected to a computer pointing device (e.g. a mouse), a stylus, or a joystick, or the device 1 can be connected to an eye-tracking device identifying the position on the screen set by the user.

A pointing to a graphemic entity can be considered if the pointing is actually done by the user on this graphemic entity or below this graphemic entity. In the example shown in FIG. 8, the user has pointed to a graphemic entity in the succession rather than under it. In order to allow the user to view the pointed graphemic entity without alteration, this graphemic entity 802 is advantageously displayed above the pointing zone and the succession 81. The graphemic entity 802 remains displayed in the vicinity of the succession 81, so that the user is encouraged to continue pointing to the graphemic entity 813.

The invention has been illustrated here using a digital tablet device 1. A smartphone or personal computer type device 1 with a display screen can also be considered.

It is also possible that the device 1 is equipped with a microphone. The device 1 can then be configured to register the user. For example, the user can be asked to verbally state the phonemic entity associated with the pointed graphemic entity. The device 1 can then be configured to compare the phonemic entity spoken by the user with the phonemic entity stored in the database 14. It is thus possible to check whether the user is able to render vocally the phonemic entity associated with the pointed graphemic entity. This allows, for example, to check the quality of the user's learning.

The assisting method according to the invention can be implemented by a device storing a computer program configured to implement this method when executed on the device. The assistance method according to the invention can also be implemented on a terminal by using a server providing software access as a service. A software-as-a-service operation deployed from a remote server allows the process to be implemented on a terminal with reduced performance.

The method can be implemented as a method of displaying graphemic entities and phonemic entities rendering, interactive with a user's pointing.

According to a second embodiment of the invention, a succession of adjacent graphemic entities is displayed on a screen with first values of display parameters. The user's pointing of one of the graphemic entities, and displayed with these display parameters, is detected. Simultaneously, the following is displayed:

the pointed graphemic entity, with second values of display parameters, at least one of the second values being different from one of the first values, so as to enable identification of the graphemic entity by the user and so as to cause the user to perceive a change in the display of the pointed graphemic entity;

the adjacent graphemic entities of the pointed graphemic entity, with the first values. During the display of the pointed graphemic entity with the second values of the display parameters, a phonemic entity associated with this pointed graphemic entity is acoustically rendered.

Thus, the user can focus his/her vision on the pointed graphemic entity, the adjacent graphemic entities remaining displayed with the first values of the display parameters to reduce the phenomenon of interference of the elements present in peripheral vision. Because of the acoustic rendering of the phonemic entity associated with this pointed graphemic entity and displayed with the second display parameter values, the user can very accurately mentally associate this pointed graphemic entity and the acoustically rendered phonemic entity.

In general, the second values of the display parameters are intended to perceptually highlight the pointed graphemic entity. For example, the pointed graphemic entity can be highlighted in relation to its display with the first values of the display parameters, or in relation to the display of the adjacent graphemic entities with the first values of the display parameters.

The display parameters will advantageously be selected from the group consisting of the contrast between the graphemic entity and the background, brightness of the graphemic entity, character fatness of the graphemic entity, chromaticity of the graphemic entity, blurring methods, Gaussian blurring, high spatial frequency suppression filtering, including low pass linear digital filtering, digital noise, an encoding compression ratio, a subsampling level, and a magnification level.

The distinction between the first and second values of the display parameters can be based on a corresponding alteration of the display, e.g. by contrast, brightness, Gaussian blur, digital noise, wavelet transformation with a given wavelet number (e.g. JPEG-like compression), subsampling level or average filter level. The first values of the display parameters are then used to apply an alteration to the display of the graphemic entities. The second values of the display parameters are then used to display the pointed graphemic entity with no alteration or with less alteration.

Human vision extends over a wide area of about 120° of visual angle in binocular vision. However, humans only fully perceive details and colours in a small part of their visual field, called the foveal region. The foveal region has a half-opening angle of between 1 and 2°. Beyond the foveal region, the density of photoreceptors covering the human retina decreases sharply, first in a parafoveal region extending to a half aperture angle of about 5° and then in a peripheral region for a half aperture angle greater than 5°.

Human vision has a relatively poor ability to discriminate details beyond the foveal region, as if the scene being observed were blurred.

Despite this, the human perception of the environment is colourful and very detailed. Indeed, to apprehend the surrounding space, the eyes are in constant motion to capture multiple images. These different images are then assembled by the brain. The global image that humans are aware of is thus actually the result of the integration of the continuous exploration of the environment by the oculomotor system. In particular, despite the rapid decrease in photoreceptor density on the retina, the human oculomotor system is able to extract a large amount of information from the peripheral region to guide oculomotor scanning behaviour.

The alteration between the display of a pointed graphemic entity and adjacent graphemic entities can be determined objectively, using the following test. Let T2 be a pointed graphemic entity displayed with the second display parameters, and T1 a graphemic entity displayed with the first display parameters (T1 can either be the same graphemic entity or an adjacent one). We calculate S2, the minimum standard deviation of a Gaussian blur applied to the T2 feature to make it imperceptible. We calculate S1, the minimum standard deviation of a Gaussian blur applied to the T1 feature to make it imperceptible. The parameter M=S2/S1 is defined.

M=1 means that there is no difference from a perceptual point of view. If M>1, displaying T2 with the second parameters improves its perception. Advantageously, the first and second display parameters can be configured so that M>1.2, preferably M>1.5 and optimally M>2.

In a particular case detailed later, the alteration is a Gaussian blur implemented with the first values of the display parameters.

Here, the database 14 stores a set of graphemes (or graphemic entities), to be displayed according to a succession of adjacent graphemic entities. For each of these graphemic entities, the database contains an associated phonemic entity to be rendered acoustically, as shown in the example in FIG. 9.

The device 1 is intended to implement a method to assist with learning to read according to this second embodiment. Such a support method includes the following steps, which can be illustrated by the diagram in FIG. 10:

In step 121, a succession 81 of adjacent graphemic entities is displayed on the screen 11, as shown in FIG. 3. The succession 81 of graphemic entities includes in particular the graphemic entities 811, 812, 813 and 814. The graphemic entities of the succession 81 are here altered in such a way as to enable their detection by a user when displayed, but in such a way as to prevent their identification. The graphemic entities displayed with alteration thus enable their detection by the user, so that s/he be able to point to them. In other words, the altered graphemic entities have an alteration that makes them locatable but not legible, in order to prompt exploration.

These graphemic entities correspond, for example, to a sentence 80 as shown in FIG. 2. The sentence 80 includes, in particular, graphemic entities 801, 802, 803 and 804 corresponding to syllables. These graphemic entities include several graphemes for the most part. The length of the graphemic entities is illustrated here by a brace. In the example of the French language, the sentence 80 is displayed as a succession of graphemic entities aligned in a horizontal direction, to be read from left to right. The sentence 80 in FIG. 2 will be used here as an example of assistance with learning to read. Step 121 corresponds, for example, to a step for starting the learning process, where the set of displayed graphemic entities is altered, using the first values of display parameters. The graphemic entity with alteration is here a special case generated by blurring, as shown in FIG. 3. Advantageously, no acoustic rendering is performed during the display of the succession 81, as indicated by the state 90 of the loudspeaker in FIG. 3.

In step 122, the user's pointing of the graphemic entity with alteration, and displayed 811, is detected. This pointing is illustrated by pointer 7 in FIG. 4.

In step 123, as shown in FIG. 4, the following is displayed simultaneously:
- the pointed graphemic entity without alteration 801, corresponding to the syllable 'La' in French;
- the adjacent graphemic entity with alteration 812. The graphemic entity 812 is considered altered if it cannot be identified in by the user. Thus, a graphemic entity will be considered altered even if it is partially displayed without alteration but is not identifiable by a user. In this example, all other graphemic entities in succession 81 other than graphemic entity 801 are displayed with alteration.

During the display of the pointed graphemic entity 801 without alteration, a phonemic entity associated with the graphemic entity 801 is acoustically rendered to the user. As shown in FIG. 4, the loudspeaker performs acoustic rendering of the syllable 'La', as indicated by its state 91.

In step 124, the user's pointing of the graphemic entity with alteration, and displayed 812, is detected. This pointing is illustrated by pointer 7 in FIG. 5.

In step 125, as shown in FIG. 5, the following is displayed simultaneously:
- the pointed graphemic entity with alteration 802, corresponding to the syllable 'sou' in French;
- the preceding graphemic entity with alteration 811 and the following graphemic entity with alteration 813. Because of the display with alteration of these adjacent graphemic entities, the user's attention can remain focused on the pointed graphemic entity 802, displayed without alteration. In this example, all other graphemic entities in succession 81 other than graphemic entity 802 are displayed with alteration.

During the display of the pointed graphemic entity 802 without alteration, a phonemic entity associated with the graphemic entity 802 is acoustically rendered to the user. As shown in FIG. 5, the loudspeaker performs acoustic rendering of the syllable 'su', as indicated by its state 92.

The assistance process continues recurrently for each new pointed graphemic entity. In step 126, the user's pointing of the graphemic entity with alteration, and displayed 813, is detected. This pointing is illustrated by pointer 7 in FIG. 6.

In step 127, as shown in FIG. 6, the following is displayed simultaneously:
- the pointed graphemic entity with alteration 803, corresponding to the syllable 'sou' in French;
- the preceding graphemic entity with alteration 812 and the following graphemic entity with alteration 814. Because of the display with alteration of these adjacent graphemic entities, the user's attention can remain focused on the pointed graphemic entity 803, displayed without alteration. In this example, all other graphemic entities in succession 81 other than graphemic entity 803 are displayed with alteration. As shown in FIG. 6, the loudspeaker performs the acoustic rendering of the phonetic syllable

TABLES 2

| 'ʙi' |
|---| as indicated by its state 93.

The application of the first and second values of the display properties of the graphemic entities can be achieved by defining the size of the display zones to which the first and second values are to be applied. The length of the display zone to which the first values are applied corresponds to the length of the corresponding graphemic entity. A second display parameter value can be associated with each of the points in the test area. The values of this parameter can initially be set at several points:

at the beginning and end of the display zone of the graphemic entity, the value of the parameter corresponds to the width of a space character;

at the centre of the graphemic entity, the value of the parameter is defined from the total length of the graphemic entity;

the values of the parameter outside the graphemic entities can be fixed to a value which keeps the display with alteration.

The other parameter values can be obtained by interpolation between the value at the centre of a graphemic entity and the value at one end of the graphemic entity.

As detailed earlier, the display with the second values is not necessarily applied under the location pointed by the user but on the graphemic entity closest to or above the pointed location. Indeed, for example for a touch screen, the user will be encouraged to point under the graphemic entities to be read, and not on the graphemic entities to be read so that the vision of a displayed graphemic entity is not hindered by the user's finger. If the graphemic entities are displayed as a global image, the display parameters with the second values can be applied at a position vertically offset above the pointed location.

The invention claimed is:

1. A method for assisting a user in reading and in learning to read, said method comprising causing a digital system to display a succession of graphemic entities on a screen, said displayed graphemic entities being displayed with first values for several display parameters so as to enable their detection or identification by said user, causing said digital system to detect when said user has pointed to a particular graphemic entity with said first values of said display parameters, causing said digital system to simultaneously display, on said screen, those graphemic entities that are adjacent to said particular graphemic entity with said first values of said display parameters and said particular graphemic entity with second values for said display parameters, at least one of said second values being different from one of said first values for a given display parameter so as to enable identification of said particular graphemic entity by said user and so as to cause said user to perceive a change in display, and causing said digital system to acoustically render a phonemic entity associated with said particular graphemic entity to which said user has pointed, wherein said first values of said display parameters cause said graphemic entities to be displayed with an alteration that enables said graphemic entities to be detected but not identified.

2. The method of claim 1, further comprising selecting said display parameters from the group consisting of contrast between said graphemic entity and a background, brightness of said graphemic entity, character fatness of said graphemic entity, chromaticity of said graphemic entity, blurring methods, Gaussian blurring, high spatial-frequency suppression filtering, digital noise, an encoding compression ratio, a subsampling level, and a magnification level.

3. The method of claim 1, wherein said first values of said display parameters are identical for those graphemic entities that are adjacent to said particular graphemic entity.

4. The method of claim 1, wherein said first values of said display parameters cause said graphemic entity to be displayed with alteration thereof.

5. The method of claim 1, wherein said graphemic entities are syllables.

6. The method of claim 1, further comprising a prior step of preparing said succession of adjacent graphemic entities that are to be displayed, wherein said prior step comprises receiving text, segmenting said received text into a succession of syllables, and associating each of said syllables with a phonemic entity that is to be rendered acoustically.

7. The method of claim 1, further comprising retrieving said displayed graphemic entities and retrieving rendered phonemic entities from a database.

8. The method of claim 1, further comprising using speech synthesis to generate said acoustically rendered phonemic entity from said particular graphemic entity.

9. The method of claim 1, wherein detecting when a user points to a particular graphemic entity comprises using at least one of detecting activity on a touch screen, tracking eye movement of said user, and detecting a user's use of a computer pointing device.

10. A method for assisting a user in reading and in learning to read, said method comprising causing a digital system to display a succession of graphemic entities on a screen, said displayed graphemic entities being displayed with first values for several display parameters so as to enable their detection or identification by said user, causing said digital system to detect when said user has pointed to a particular graphemic entity with said first values of said display parameters, causing said digital system to simultaneously display, on said screen, those graphemic entities that are adjacent to said particular graphemic entity with said first values of said display parameters and said particular graphemic entity with second values for said display parameters, at least one of said second values being different from one of said first values for a given display parameter so as to enable identification of said particular graphemic entity by said user and so as to cause said user to perceive a change in display, and causing said digital system to acoustically render a phonemic entity associated with said particular graphemic entity to which said user has pointed, wherein said first values of said display parameters cause said graphemic entity to be displayed with alteration thereof, wherein said alteration is such that a ratio of a minimum standard deviation of a Gaussian blur to be applied to said particular graphemic entity displayed with said second values to enable identification thereof to a minimum standard deviation of a Gaussian blur to be applied to a displayed graphemic entity with said first values to prevent identification thereof is greater than 1.2.

11. The method of claim 10, wherein said first values of said display parameters are identical for those graphemic entities that are adjacent to said particular graphemic entity.

12. The method of claim 10, wherein said first values of said display parameters cause said graphemic entity to be displayed with alteration thereof.

13. The method of claim 10, wherein said graphemic entities are syllables.

14. The method of claim 10, further comprising a prior step of preparing said succession of adjacent graphemic entities that are to be displayed, wherein said prior step comprises receiving text, segmenting said received text into a succession of syllables, and associating each of said syllables with a phonemic entity that is to be rendered acoustically.

15. The method of claim 10, further comprising retrieving said displayed graphemic entities and retrieving rendered phonemic entities from a database.

16. The method of claim 10, further comprising using speech synthesis to generate said acoustically rendered phonemic entity from said particular graphemic entity.

17. The method of claim 10, wherein detecting when a user points to a particular graphemic entity comprises using at least one of detecting activity on a touch screen, tracking eye movement of said user, and detecting a user's use of a computer pointing device.

18. The method of claim 10, further comprising selecting said display parameters from the group consisting of contrast between said graphemic entity and a background, brightness of said graphemic entity, character fatness of said graphemic entity, chromaticity of said graphemic entity, blurring methods, Gaussian blurring, high spatial-frequency suppression filtering, digital noise, an encoding compression ratio, a subsampling level, and a magnification level.

19. An apparatus for assisting a user in learning to read, said apparatus comprising a digital-processing device having an interface for connection to a sound-rendering device, an interface for connection to a man-machine pointing interface, and a screen-connecting interface for connection to a display screen, wherein said digital-processing device is configured to send commands to display a succession of adjacent graphemic entities on said screen via said screen-connection interface, wherein said graphemic entities to be displayed comprise first values for several display parameters so as to enable their detection or identification by said user, wherein said first values of said display parameters cause said graphemic entities to be displayed with an alteration that enables said graphemic entities to be detected but not identified, wherein said digital-processing device is further configured to process pointing information from said man-machine pointing interface so as to detect when said pointing has pointed to a particular displayed graphemic entity with said first values of said display parameters and to send commands for simultaneous display on said screen of said particular graphemic entity with second values for said display parameters, at least one of said second values being different from one of said first values for a given display parameter so as to enable said user to identify said particular graphemic entity and so as to cause said user to perceive a change in display of said particular graphemic entity and adjacent graphemic entities that are adjacent to said particular graphemic entity with said first values for said display parameters and to send acoustic rendering commands to render, for said user, a phonemic entity associated with said particular graphemic entity.

20. An apparatus for assisting a user in learning to read, said apparatus comprising a digital-processing device having an interface for connection to a sound-rendering device, an interface for connection to a man-machine pointing interface, and a screen-connecting interface for connection to a display screen, wherein said digital-processing device is configured to send commands to display a succession of adjacent graphemic entities on said screen via said screen-connection interface, wherein said graphemic entities to be displayed comprise first values for several display parameters so as to enable their detection or identification by said user, wherein said first values of said display parameters cause said graphemic entity to be displayed with alteration thereof, wherein said alteration is such that a ratio of a minimum standard deviation of a Gaussian blur to be applied to said particular graphemic entity displayed with said second values to enable identification thereof to a minimum standard deviation of a Gaussian blur to be applied to a displayed graphemic entity with said first values to prevent identification thereof is greater than 1.2, wherein said digital-processing device is further configured to process pointing information from said man-machine pointing interface so as to detect when said pointing has pointed to a particular displayed graphemic entity with said first values of said display parameters and to send commands for simultaneous display on said screen of said particular graphemic entity with second values for said display parameters, at least one of said second values being different from one of said first values for a given display parameter so as to enable said user to identify said particular graphemic entity and so as to cause said user to perceive a change in display of said particular graphemic entity and adjacent graphemic entities that are adjacent to said particular graphemic entity with said first values for said display parameters and to send acoustic rendering commands to render, for said user, a phonemic entity associated with said particular graphemic entity.

* * * * *